(12) United States Patent
Tripathi et al.

(10) Patent No.: US 9,305,245 B2
(45) Date of Patent: Apr. 5, 2016

(54) METHODS AND SYSTEMS FOR EVALUATING HANDWRITTEN DOCUMENTS

(71) Applicant: Xerox Corporation, Norwalk, CT (US)

(72) Inventors: Abhishek Tripathi, Bangalore (IN); Nischal M Piratla, Hyderabad (IN)

(73) Assignee: Xerox Corporation

( * ) Notice: Subject to any disclaimer, the term of this patent is extended or adjusted under 35 U.S.C. 154(b) by 128 days.

(21) Appl. No.: 13/888,401

(22) Filed: May 7, 2013

(65) Prior Publication Data

US 2014/0334731 A1    Nov. 13, 2014

(51) Int. Cl.
  *G06K 9/00* (2006.01)
  *G06K 9/72* (2006.01)

(52) U.S. Cl.
  CPC ............ *G06K 9/726* (2013.01); *G06K 2209/27* (2013.01)

(58) Field of Classification Search
  None
  See application file for complete search history.

(56) References Cited

U.S. PATENT DOCUMENTS

| | | | | |
|---|---|---|---|---|
| 5,151,950 | A * | 9/1992 | Hullender | 382/187 |
| 5,392,363 | A * | 2/1995 | Fujisaki et al. | 382/187 |
| 5,680,511 | A * | 10/1997 | Baker et al. | 704/257 |
| 5,787,197 | A * | 7/1998 | Beigi et al. | 382/187 |
| 5,970,170 | A * | 10/1999 | Kadashevich et al. | 382/187 |
| 6,084,985 | A * | 7/2000 | Dolfing et al. | 382/187 |
| 6,137,908 | A * | 10/2000 | Rhee | 382/187 |
| 7,925,062 | B2 * | 4/2011 | Arai | 382/119 |
| 8,170,338 | B2 * | 5/2012 | Okita | 382/179 |
| 8,208,736 | B2 * | 6/2012 | Meyer et al. | 382/229 |
| 2001/0016856 | A1 * | 8/2001 | Tsuji | G06F 3/043 715/222 |
| 2002/0147731 | A1 * | 10/2002 | Seestrom et al. | 707/104.1 |
| 2004/0218801 | A1 * | 11/2004 | Houle | G06K 9/00154 382/137 |
| 2005/0226512 | A1 * | 10/2005 | Napper | 382/229 |
| 2009/0161958 | A1 * | 6/2009 | Markiewicz et al. | 382/186 |
| 2009/0324107 | A1 * | 12/2009 | Walch | 382/224 |
| 2010/0312705 | A1 * | 12/2010 | Caruso et al. | 705/45 |

OTHER PUBLICATIONS

U.S. Appl. No. 13/559,630, filed Jul. 27, 2012; Ponnavaikko et al; "Method and System for Automatically Checking Completeness and Correctness of Application Forms".

* cited by examiner

*Primary Examiner* — Randolph I Chu (57) ABSTRACT

A method, a system, and a computer program product for evaluating a handwritten document comprising one or more text fields are provided. The method includes identifying a character in each of the one or more text fields in a digital image by applying a character recognition technique. The character type of the identified character is then compared with a predefined character type corresponding to the associated text field of the one or more text fields. The character type in each of the one or more text fields is then validated based on the comparison. Thereafter the identified character for each of the one or more text fields is recommended while digitalization of the handwritten document.

16 Claims, 7 Drawing Sheets

If you are an existing customer please move directly to section "c".

*NAME TO BE DISPLAYED ON ATM/DEBIT CARD/CORRESPONDENCE

1st Appl.
2nd Appl.
3rd Appl.

*DATE OF BIRTH    Category    *Male/Female

1st Appl.
2nd Appl.
3rd Appl.

METHODS AND SYSTEMS FOR EVALUATING HANDWRITTEN DOCUMENTS

TECHNICAL FIELD

The presently disclosed embodiments are directed to processing of handwritten documents. More particularly, the presently disclosed embodiments are related to a technique for digitizing handwritten documents.

BACKGROUND

Currently many applications facilitate form filling such as, but are not limited to, bank account opening, mobile connection, electricity connection, health or insurance claim forms digitization by manually filling each field in the respective forms or applying OCR techniques. The processing of such hand-filled forms is usually performed in the back office of respective organizations, which may be costly in terms of both time and money. In addition, various state of the art processing techniques determines the completeness of the form by checking if there is any content filled in one or more text fields of the hand-filled form. However, the existing processing techniques have the limitation that it assumes the form to be complete and correct even if there is a scribble or wrongly filled in the one or more text fields.

In addition, during the auto-population of hand-written content in the forms in the back-office transcription scenarios, for a given hand-filled form, a data-entry operator either fills the whole content of the form manually or gets a set of options to choose from. The latter approach is an automatic way but it is very hard to recommend a correct word based on a word-image, especially for the hand-written content. Therefore, even if one character is incorrectly recognized, the data-entry operator usually deletes the whole recommendation and types it afresh. Thus this requires at least as many keystrokes (if not more for using backspace to delete the recommendation) and time as it would take in manual data entry.

SUMMARY

According to embodiments illustrated herein, there is provided a method implementable on a computing device for evaluating a handwritten document including one or more text fields. The method includes identifying a character in each of the one or more text fields in a digital image by applying a character recognition technique. The digital image is obtainable by scanning the handwritten document. A character type of the identified character comprises at least one of a letter, a symbol, a number, or a special character. The character type of the identified character is then compared with a predefined character type corresponding to the associated text field of the one or more text fields. The character type in each of the one or more text fields is then validated based on the comparison. The identified character for each of the one or more text fields is recommended while digitalization of the handwritten document.

According to embodiments illustrated herein, there is provided a system for evaluating a handwritten document is provided. The system includes an image-processing module, a validation module, and a recommendation module. The image-processing module is configured for identifying a character in each of one or more text fields from a digital image by applying a character recognition technique. The validation module is configured for validating the character type in each of the one or more text fields, wherein the validation is based on a comparison of the character type of the identified character with a predefined character type corresponding to the associated text field of the one or more text fields. The recommendation module is configured for recommending the identified character in each of the one or more text fields while digitalization of the handwritten document.

According to embodiments illustrated herein, there is provided a computer program product for use with a computer, the computer program product comprising a computer readable program code for evaluating a handwritten document comprising one or more text fields. The computer readable program code includes program instruction means for identifying a character in each of the one or more text fields in a digital image by applying a character recognition technique. The digital image is obtainable by scanning of the handwritten document; a character type of the identified character comprises at least one of a letter, a symbol, a number, or a special character. The computer readable program code further includes program instruction means for comparing the character type of the identified character with a predefined character type corresponding to the associated text field of the one or more text fields. The computer readable program code further includes program instruction means for validating the character type in each of the one or more text fields based on the comparison. The computer readable program code further includes program instruction means for recommending the identified character for each of the one or more text fields while digitalization of the handwritten document, wherein the recommending is based on the identification.

BRIEF DESCRIPTION OF DRAWINGS

The accompanying drawings illustrate various embodiments of systems, methods, and other aspects of the disclosure. Any person having ordinary skill in the art will appreciate that the illustrated element boundaries (e.g., boxes, groups of boxes, or other shapes) in the figures represent one example of the boundaries. It may be that in some examples, one element may be designed as multiple elements or that multiple elements may be designed as one element. In some examples, an element shown as an internal component of one element may be implemented as an external component in another, and vice versa. Furthermore, elements may not be drawn to scale.

Various embodiments will hereinafter be described in accordance with the appended drawings, which are provided to illustrate, and not to limit the scope in any manner, wherein like designations denote similar elements, and in which.

DETAILED DESCRIPTION

The present disclosure is best understood with reference to the detailed figures and description set forth herein. Various embodiments are discussed below with reference to the figures. However, those skilled in the art will readily appreciate that the detailed descriptions given herein with respect to the figures are simply for explanatory purposes as the methods and systems may extend beyond the described embodiments. For example, the teachings presented and the needs of a particular application may yield multiple alternate and suitable approaches to implement the functionality of any detail described herein. Therefore, any approach may extend beyond the particular implementation choices in the following embodiments described and shown.

References to "one embodiment", "an embodiment", "at least one embodiment", "one example", "an example", "for example" and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in an embodiment" does not necessarily refer to the same embodiment.

DEFINITIONS

The following terms shall have, for the purposes of this application, the respective meanings set forth below.

A "computing device" refers to a computer, a device including a processor/microcontroller and/or any other electronic component, device or system that performs one or more operations according to one or more programming instructions. Examples of the computing device include, but are not limited to, a desktop computer, a laptop, a personal digital assistant (PDA), a Smartphone, or the like. The computing device is capable of accessing (or being accessed over) a network (e.g., using wired or wireless communication capabilities).

A "network" refers to a medium that interconnects a server, a multifunction device, and various computing devices. Examples of the network include, but are not limited to, LAN, WLAN, MAN, WAN, and the Internet. The communication over the network may be performed in accordance with various communication protocols such as Transmission Control Protocol and Internet Protocol (TCP/IP), User Datagram Protocol (UDP), and IEEE 802.11n communication protocols.

A "multifunction device" (MFD) refers to a device that can perform multiple functions. Examples of the functions include, but are not limited to, scanning, printing, copying, faxing, emailing, and the like.

A "digital image" or "scanned document" or "electronic document" refers to information recorded in a manner that requires a computing device or other electronic device to display, interpret, and process it. Electronic documents are intended to be used either in an electronic form or as printed output. In an embodiment, the electronic document includes one or more of text (handwritten or typed), image, symbols, and so forth. In an embodiment, the electronic document is obtained by scanning a document using a suitable scanner or an MFD. In an embodiment, the scanned document is a digital image. The digital image refers to a collection of data, including image data in any format, retained in an electronic form. The digital image can contain one or more pictorial, symbols, text, line art, blank, or non-printed regions, etc. The digital image can be stored in various file formats, such as, JPG or JPEG, GIF, TIFF, PNG, BMP, RAW, PSD, PSP, PDF, and the like. Hereinafter, the terms "electronic document", "scanned document", "image", and "digital image" are interchangeably used without departing from the scope of the ongoing description.

"Scanning" refers to a technique of recording an image as digital data in any format, thereby creating a file.

"Graphical User Interface" OR "GUI" refers to an interface that facilitates a user to interact with associated computing devices or MFD. The user can interact with the GUI using various input mediums/techniques including, but not limited to, a keypad, mouse, joystick, any touch-sensitive medium (e.g., a touch-screen or touch sensitive pad), voice recognition, gestures, video recognition, and so forth.

An "Optical Character Recognition" or "OCR" operation refers to the conversion of scanned images of handwritten, typewritten, or printed text into machine-encoded text.

An "Intelligent Character Recognition" or "ICR" operation refers to the conversion of scanned images of handwritten text into machine-encoded text.

Figure 1:
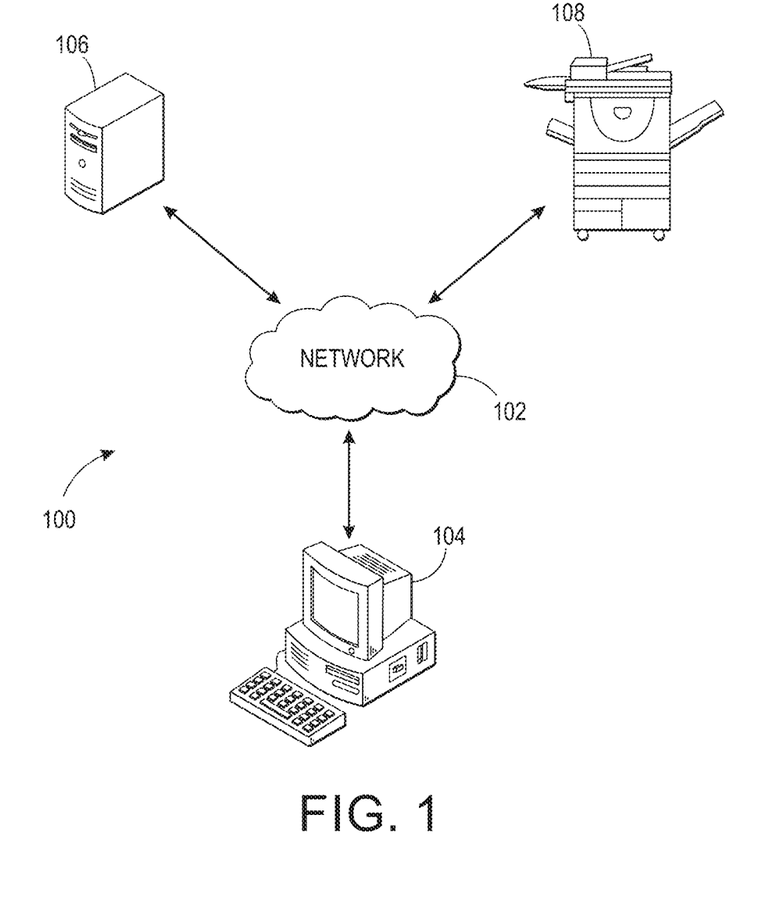
FIG. 1 illustrates a block diagram illustrating an environment in which various embodiments can be implemented.

FIG. 1 is a block diagram illustrating a system environment 100, in accordance with at least one embodiment. The system environment 100 includes a network 102, a computing device 104, a server 106, and an MFD 108. Although FIG. 1 shows a single computing device (e.g., desktop computer) for simplicity, the disclosed embodiments can be implemented for a large number of computing devices including, but not limited to, laptops, smart phones, PDAs, and various similar handheld devices. Similarly, other devices such as printers or scanners can be present in the system environment 100 for facilitating associated functionalities.

A user operating the computing device 104 is capable of accessing the MFD 108 and/or the server 106 through the network 102 or directly (i.e., physical access). A functionality of facilitating the evaluation of a handwritten document can be implemented on at least one of the computing device 104, the MFD 108, or the server 106. In an embodiment, for example, the computing device 104 or the MFD 108 is configured to execute an application for facilitating evaluation of the handwritten document. In another embodiment, the application for facilitating evaluation of the handwritten document is hosted on the server 106, which can be accessed at the computing device 104 through an associated client, or a web based interface.

Figure 2:
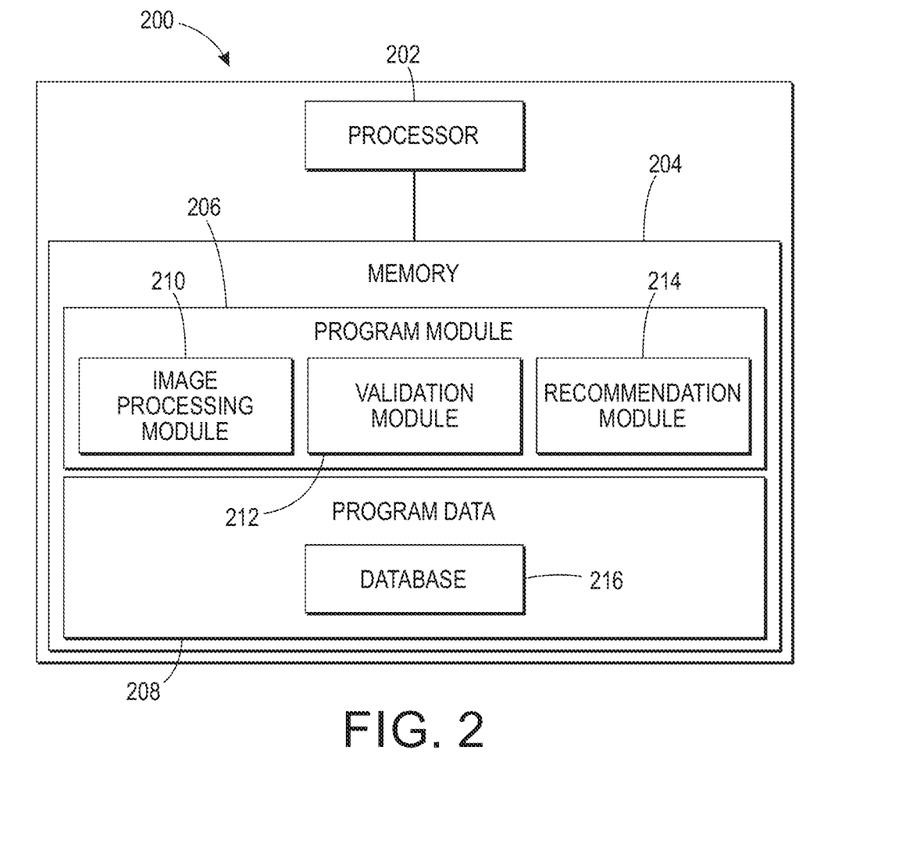
FIG. 2 illustrates a block diagram illustrating a system for evaluating a handwritten document, in accordance with at least one embodiment.

FIG. 2 illustrates a block diagram illustrating a system 200 for evaluating the handwritten document, in accordance with at least one embodiment. In an embodiment, the system 200 corresponds to the server 106. In another embodiment, the system 200 corresponds to a computing device 104. In yet another embodiment, the system 200 corresponds to the MFD 108.

The system 200 includes a processor 202 coupled to a memory 204. The processor 202 is configured to execute a set of instructions stored in the memory 204 to perform one or more operations. The processor 202 fetches the set of instructions from the memory 204 and executes the set of instructions. The processor 202 can be realized through a number of processor technologies known in the art. Examples of the processor include an X86 processor, a RISC processor, or an ASIC processor. In an embodiment, the processor 202 includes a Graphics Processing Unit (GPU) that executes the set of instructions to perform one or more processing operations.

The memory 204 is configured to store the set of instructions or modules. Some of the commonly known memory implementations can be, but are not limited to, a random access memory (RAM), a read-only memory (ROM), a hard disk drive (HDD), and a secure digital (SD) card. The memory 204 includes a program module 206 and a program data 208. The program module 206 includes a set of instructions that can be executed by the processor 202 to perform specific actions. The program module 206 further includes an image-processing module 210, a validation module 212, and a recommendation module 214.

The program data 208 includes a database 216. The database 216 is a storage medium that stores the data submitted from and/or required by the image-processing module 210, the validation module 212, and the recommendation module 214. In an embodiment, the database 216 can be implemented using technologies, including, but not limited to Oracle®, IBM DB2®, Microsoft SQL Server®, Microsoft Access®, PostgreSQL®, MySQL®, and SQLite®. In an embodiment, the database 216 stores the handwritten document that includes one or more text fields. In another embodiment, the database 216 stores a plurality of handwritten documents. In yet another embodiment, the database 216 stores the associated predefined character types corresponding to each of the one or more text fields of a digital image (obtainable by scanning of the handwritten document).

In an embodiment, the system 200 may include a display that facilitates the display of a GUI and interaction with the system 200 in conjunction with the input mediums. The display can be realized through several known technologies, such as, Cathode Ray Tube (CRT) based display, Liquid Crystal Display (LCD), Light Emitting Diode (LED)-based display, Organic LED display technology, and Retina Display technology. Further, the display can be a touch-screen capable of receiving user inputs.

The image-processing module 210 is configured for facilitating the generation of a digital image based on the handwritten document. The handwritten document generally includes one or more text fields, and each of the one or more text fields is filled with characters. In an embodiment, a character includes at least one of one or more alphabetic characters, one or more numeric characters, one or more marks, one or more outliers, or one or more hand-drawn drawings.

In an embodiment, the image-processing module 210 further facilitates the scanning of the handwritten document. The image-processing module 210 then facilitates the compilation of the image data captured by various image-capturing units to generate the digital image (e.g., scanned document) from the handwritten document.

In another embodiment, the system 200 may include image-scanning equipment (not shown), which is capable of scanning handwritten document to generate corresponding electronic document (e.g., digital image) in conjunction with the image-processing module 210. The image-scanning equipment implements various CCD devices and/or CMOS devices to capture images of scanned document or electronic document. In an embodiment, the image-scanning equipment implements a linear scanning technique. In another embodiment, the image-scanning equipment implements a two-dimensional scanning technique. Once the scanning is complete, the image-scanning equipment stores the electronic document (e.g., the digital image) in the database 216.

The image-processing module 210 may also employ a format conversion system, which can selectively separate handwritten notes from hand-drawn sketches in the handwritten document and convert the handwritten notes to typewritten text and the hand-drawn sketches to easily editable vector-based computer drawings.

The image-processing module 210 processes the digital image by separating the text and the images from the digital image. In an embodiment, the image-processing module 210 implements a MRC technique on the digital image to separate the text and the pictures/pictorial content. Based on the MRC technique, the image-processing module 210 extracts the character with different text fonts/colors into separate planes. In another embodiment, the image-processing module 210 implements the auto windowing technique to separate the text and the pictures in images of the digital image. However, it will be apparent to a person having ordinary skill in the art that any other suitable technique for separating the text and the pictorial content can be implemented by the image-processing module 210 without limiting the scope of the ongoing description.

In another embodiment, the image-processing module 210 is further configured for identifying a character in each of the one or more text fields from the digital image by applying a character recognition technique. The character recognition technique employs a character recognition technique for optically reading the handwritten document using an image scanner/the scanning equipment, generating image data, and recognizing a handwritten character from the image data. The character recognition tool for recognizing a handwritten character requires a configuration with which a character recognition ratio can be enhanced by taking the unique features of characters handwritten by the user. The identified character in each of the one or more text fields from the digital image is stored in the database 216.

In an embodiment, the character recognition tool that recognizes a character type of an input character by matching feature of an input character against feature of the character category entered in the database 216.

According to another embodiment, the character recognition involves various segmentation techniques for segmentation to identify the fundamental primitives of the handwritten data and to minimize the level of noise in the input character. The segmentation is also performed to reduce the amount of information used during feature extraction, and allows pattern recognition to be performed on abstract features of the input character. In the handwriting recognition systems, individual strokes are often segmented into a number of sub-stroke primitives during preprocessing. These primitives are then used directly for pattern classification.

In an embodiment, the character recognition technique can be implemented using various known Intelligent Character Recognition (ICR) engines including, but not limited to, various suitable solutions provided by Pegasus®, Nuance®, and LeadTools®.

In another embodiment, different image pre-processing techniques may be used for the character recognition technique. In an embodiment, for example, the character recognition technique is implemented using a Pegasus® ICR engine in combination with an ICR optimized image pre-processing technique. In an embodiment, for example, the character recognition technique is implemented using the Pegasus® ICR engine in combination with a mark lift optimized image pre-processing technique.

The ICR optimized image pre-processing technique is suitable mainly for recognizing handwritten alphabetic and numeric characters. Various known ICR optimized image pre-processing techniques can be used without limiting the scope of the ongoing description.

In an embodiment, the mark lift optimized image pre-processing technique is suitable mainly for recognizing various marks and various hand-drawn drawings including, but not limited to, lines, shapes, boxes, arrows, and the like. Various known mark lift optimized image pre-processing techniques can be used without limiting the scope of the ongoing description.

Further, the Intelligent Character Recognition (ICR) technique is illustrated for simplicity of explanation; however, the image-processing module 210 is not limited with respect to this technique for identifying the characters in the one or more text fields from the digital image. The number of techniques in cascade (in series or one after another, i.e., if a former technique fails to correctly determine the characters then a next technique can be applied to determine the characters) can be used by the image-processing module 210 to determine the characters in the one or more text fields from the digital image.

The validation module 212 obtains the identified characters in the one or more text fields of the digital image from the database 216. The validation module 212 also retrieves a predefined character type corresponding to the associated text field of the one or more text fields from the database 216.

The validation module 212 then facilitates comparing of the character type of the identified characters with the predefined character type corresponding to the associated text field of the one or more text fields of the digital image. The results of the comparison are stored in the database 216.

The validation module 212 is then configured to validate the character in each of the one or more text fields based on the comparison results of the character type of the identified character with the predefined character type corresponding to the associated text field of the one or more text fields.

Figure 3A:
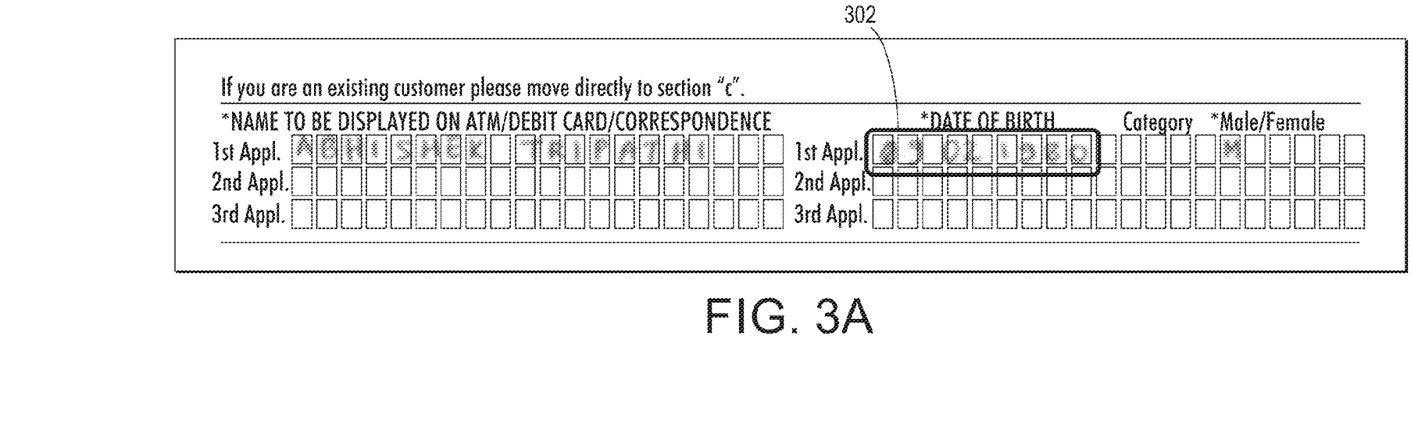
FIG. 3A depicts a snapshot of a digital image, in accordance with at least one embodiment.
Figure 3B:
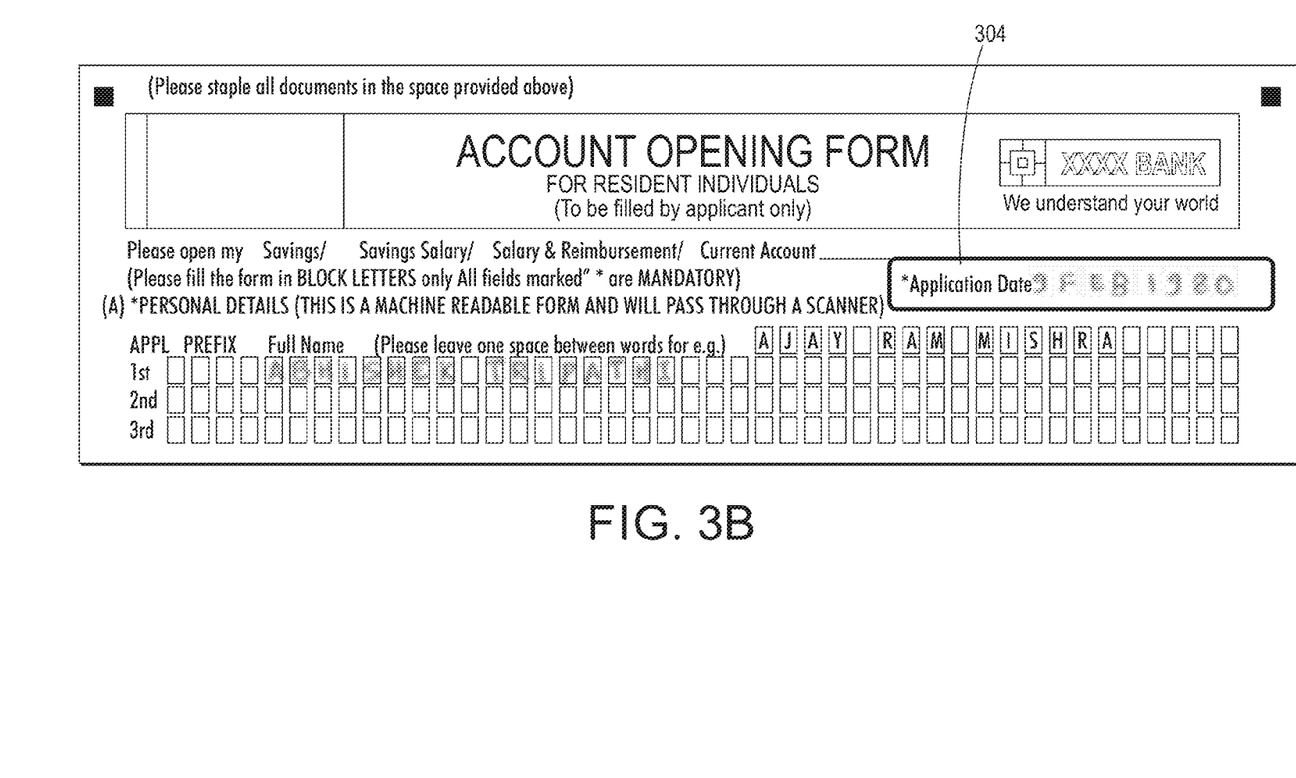
FIG. 3B depicts a snapshot of a digital image, in accordance with at least one embodiment.

In an embodiment, the validation module 212 checks whether the input character in each of the one or more text fields is legible or a scribble. In an embodiment, the text field of the one or more text fields in the digital image, where letters and digits are expected as inputted characters, each inputted character in said text fields is classified in one of the two classes: a letter (A-Z, a-z) or a digit (0-9). FIG. 3A depicts a snap shot of a digital image, in accordance with at least one embodiment. The digital image includes a date field, which is to be filled in DDMMYYYY format. However, as shown, the given user has filled date section 302 as 09021980 in FIG. 3A. The validation module 212 will check whether the inputted character (09021980) matches the character type of the format (DDMMYYYY) of the identified character. As the character type of the format (DDMMYYYY) is digit (0-9), therefore, the validation module 212 will highlight the inputted character (09021980) as an error and not legible in accord with required format (e.g., DDMMYYYY). FIG. 3B depicts a snap shot of a digital image, in accordance with at least one embodiment. The digital image includes a date field 304, which is to be filled in DDMMYYYY format. However, as shown, the given user has filled the date field 304 as 9FEB1980 in FIG. 3A. The validation module 212 will check whether the inputted character (9FEB1980) matches with the associated character types of the format (DDMMYYYY) of the identified character. As the character type of the format (DDMMYYYY) is digit (0-9), therefore, the validation module 212 will highlight the inputted character (9FEB1980) as an error and not legible in accord with required format (e.g., DDMMYYYY).

Referring back to FIG. 1, the validation module 212 further creates an evaluation report based on the validating. The evaluation report is stored in the database 216. For example, if the character type of the identified character in the one or more text fields by applying the character recognition technique matches with the predefined character type corresponding to the associated text field of the one or more text fields, then the validation module 212 determines that the corresponding character written by the user is correct. For example, if the character type of the identified character in the one or more text fields by applying the character recognition technique does not match with the predefined character type corresponding to the associated text field of the one or more text fields, then the validation module 212 determines that the corresponding character written by the user is incorrect. The validation module 212 thus generates the evaluation report based on the comparison. In an embodiment, the evaluation report includes information, such as, whether each character filled in the one or more text fields is correct or wrong. In an embodiment, the validation module 212 initiates a print command for printing the evaluation report. Thus, a printed evaluation report may be provided to the user (e.g., a customer who filled the form) so that the user can rectify the errors and fill a fresh new form with appropriate entries. In an embodiment, the evaluation report may indicate (e.g., by marking) various places in the form where errors have been made.

Figure 3C:
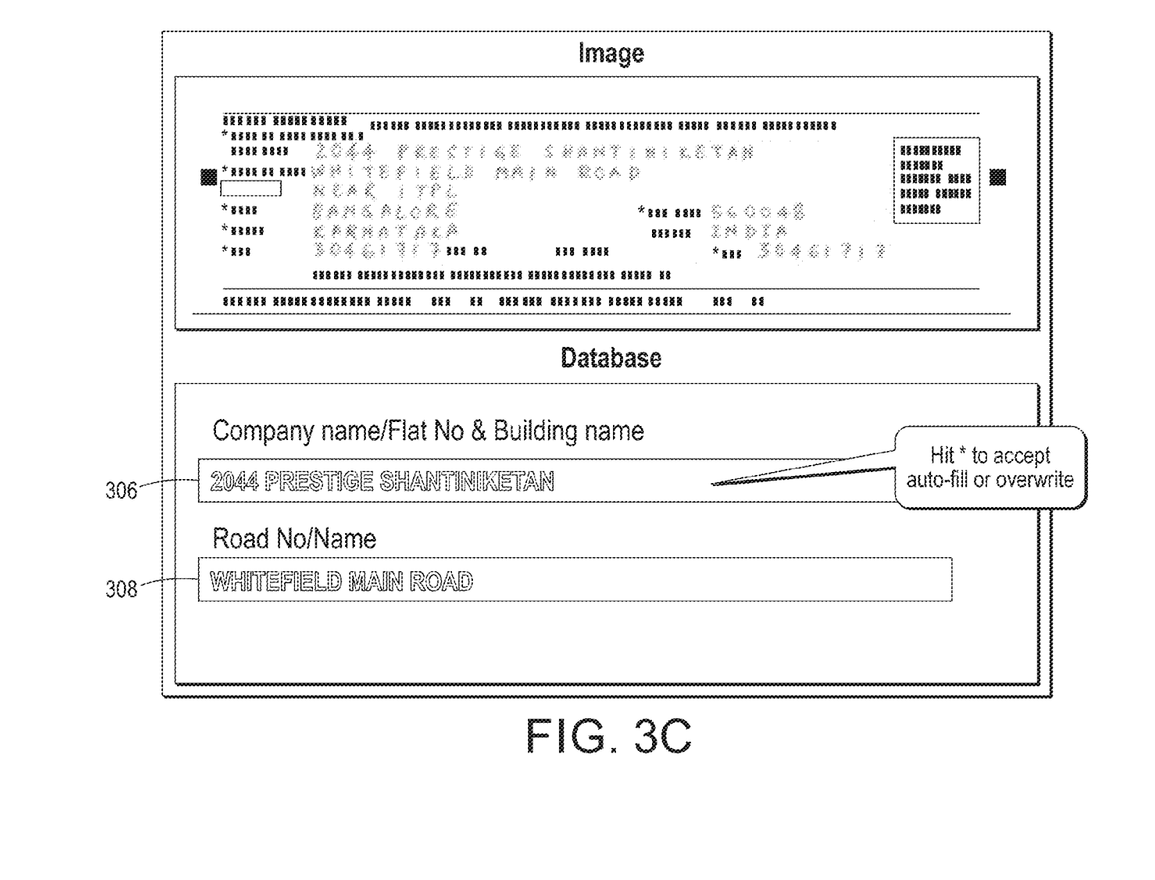
FIG. 3C depicts a display showing auto fill recommendation for handwritten content in a digital image, in accordance with at least one embodiment.

The recommendation module 214 is configured for recommending the character in each of the one or more text fields. During digitization, a data-entry user, who is entering the content from the electronic document, receives recommendations for the character in each of the one or more text fields from the recommendation module 214. The recommendation module 214 obtains the identified characters for each of the one or more text fields from the database 216, which are then recommended to the data-entry user. FIG. 3C depicts a display showing auto fill recommendation for handwritten content in a digital image/electronic document, in accordance with at least one embodiment. As shown, the recommendation module 214 provides recommendation for a company name 306 (2044 PRESTIGE SHANTINIKETAN) and a road name 308 (WHITLEFIELD MAIN ROAD) as mentioned in the digital image. This implies that the image-processing module 210 was able to identify and recognize the inputted characters in the company name 306 and the road name 308 field of the handwritten document (scanned to the digital image).

In one embodiment, the recommendation is provided in a color other than the color of the actual entered character. In another embodiment, the recommendation module 214 provides the recommendation at each keystroke, while digitization, to the data-entry user. The data-entry user can either accept or over-write the recommendation provided by the recommendation module 214 at each keystroke.

Referring back to FIG. 2, the recommendation module 214 employs several auto-fill techniques that may be configured to update the character in each of the one or more text fields while digitization of the handwritten document. The characters that auto fill techniques may update, as herein described, is for illustrative purposes only and in no way should be construed as limiting. The data (character) that is entered into the one or more text fields may be stored in the database 216 and/or communicated from processor 202, OCR or any of the other previously described devices or modules.

Figure 3D:
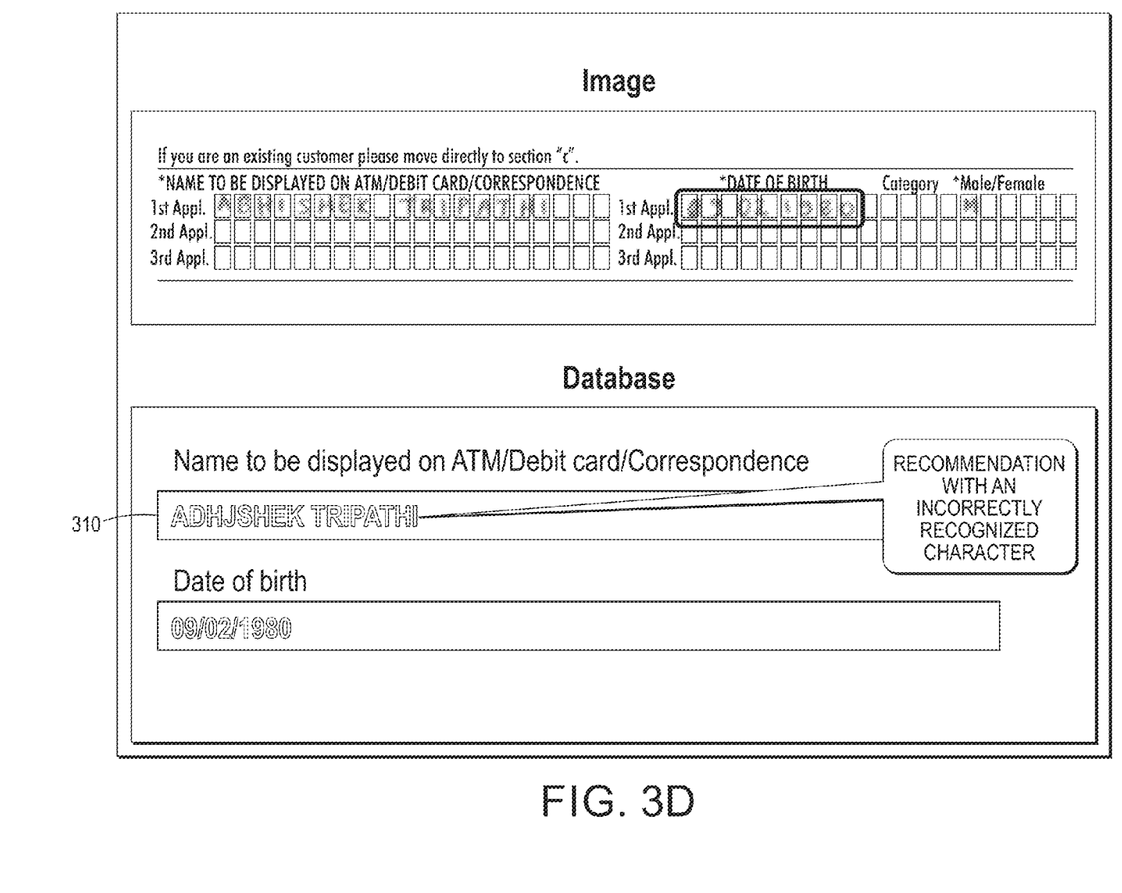
FIG. 3D depicts a display showing partial auto fill recommendation for handwritten content in a digital image, in accordance with at least one embodiment.

FIG. 3D depicts a display showing partial auto fill recommendation for handwritten content in a digital image, in accordance with at least one embodiment.

As shown in FIG. 3D, the recommendation module 214 provides incorrect recommendation for a name 310 field (ADHISHEK TRIPATHI) as mentioned in the digital image. This implies that the image-processing module 210 was not able to correctly identify and recognize the inputted characters in the name 310 field of the handwritten document (scanned to the digital image).

In an embodiment, if the image-processing module 210 does not correctly recognize all the characters in a given field, the recommendation module 214 will still provide the recommendations in a subtle text but the data-entry user can over-write the recommendations until the recommendation module 214 is recommending the incorrect character. Thereafter, the data-entry user may use the special key (provided in the keyboard or any other interface being used to type the handwritten content) to accept the remaining correctly recognized characters.

Figure 4:
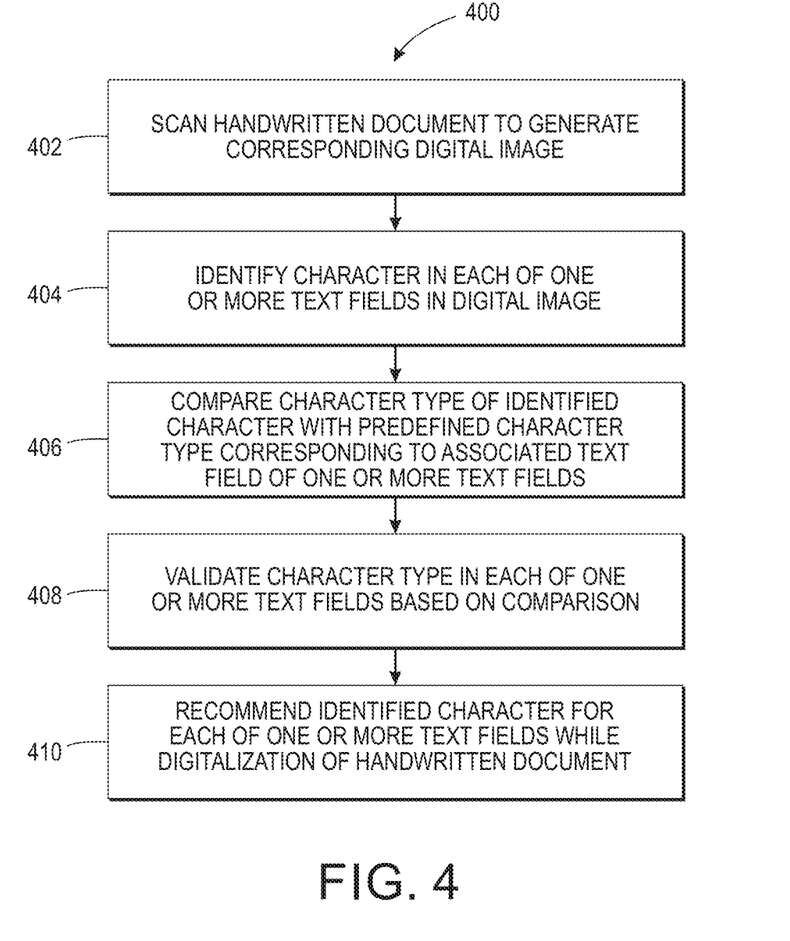
FIG. 4 illustrates a flowchart illustrating a method for evaluating a handwritten document, in accordance with at least one embodiment.

FIG. 4 illustrates a flowchart 400 illustrating a method for evaluating a handwritten document, in accordance with at least one embodiment.

At step 402, the handwritten document is scanned to generate a corresponding digital image. In an embodiment, the scanning of the handwritten document is facilitated by the image-processing module 210 in conjunction with hardware, such as scanners and digital cameras (not shown). The digital image is then stored in the database 216 by the image-processing module 210. For example, a new account opening form filled by a customer may be processed by a bank executive using the system 200.

In an embodiment, the digital image is obtained by the system 200 from various other computing devices (such as computing device 104) or the server 106 and hence the step 402 can be avoided.

At step 404, the character is identified in each of the one or more text fields in the digital image. In an embodiment, identification of the character is facilitated by applying the character recognition technique by the image-processing module 210. The character type of the identified character includes at least one of a letter, a symbol, a number, or a special character. In an embodiment, the character recognition technique is implemented using various known ICR engines, such as, various suitable solutions provided by Pegasus®, Nuance®, and LeadTools®. In another embodiment, the character recognition technique is implemented using the ICR optimized image pre-processing technique in combination with the various ICR engines, such as, various suitable solutions provided by Pegasus®, Nuance®, and LeadTools®. In this case, the ICR optimized image pre-processing technique is first applied to pre-process the electronic document so as to facilitate better extraction of the alphabetic and numeric characters from the one or more text fields. Then any suitable ICR engine is executed to determine the characters contained in each of the one or more text fields.

At step 406, the character type of the identified character is compared with the predefined character type corresponding to the associated text field of the one or more text fields. In an embodiment, the comparison of the character type of the identified character with the predefined character type corresponding to the associated text field is facilitated by the validation module 212.

At step 408, the character type in each of the one or more text fields is validated based on the comparison. In an embodiment, the validation module 212 is configured to validate the character in each of the one or more text fields based on the comparison results of the character type of the identified character with the predefined character type corresponding to the associated text field of the digital image. In one embodiment, the validated character in each of the one or more text fields is stored in the database 216. In an embodiment, the validation module 212 also generates the evaluation report based on the validation. As discussed earlier, the evaluation report represents various errors made in the electronic document (e.g., the new account opening form).

In an embodiment, if all entries are correct (e.g., the character type for each written character matches with the corresponding character type of the field); the bank executive may accept the new account opening form. If there are errors, in an embodiment, the bank executive may explain the error as mentioned in the evaluation form to the customer and ask the customer to fill a new form with appropriate entries. In alternative embodiment, the evaluation report can be printed and provided to the customer so that he can know the places where he need to provide appropriate inputs and can fill a new form.

The bank executive may again scan the new form to check if the entries are correct. In this case, the steps 402-408 will be repeated again.

Thereafter, at the time of digitization, at step 410, the identified character in each of the one or more text fields is recommended to the data entry user (e.g., an associated BPO employee, a backend user, a bank employee, a data entry operator, or the same bank executive who accepted the form). In one embodiment, the recommendation module 214 recommends the identified inputted characters in each of the one or more text fields while digitalization of the handwritten document. The recommendation is provided in a color other than the color of the actual entered character. The data-entry user can either accept (if the recommendations are correct) or over-write the recommendations (if the recommendations are incorrect) provided by the recommendation module 214.

The disclosed methods and systems, as illustrated in the ongoing description or any of its components, may be embodied in the form of a computer system. Typical examples of a computer system include a general-purpose computer, a programmed microprocessor, a micro-controller, a peripheral integrated circuit element, and other devices, or arrangements of devices that are capable of implementing the steps that constitute the method of the disclosure.

The computer system comprises a computer, an input device, a display unit and the Internet. The computer further comprises a microprocessor. The microprocessor is connected to a communication bus. The computer also includes a memory. The memory may be Random Access Memory (RAM) or Read Only Memory (ROM). The computer system further comprises a storage device, which may be a hard-disk drive or a removable storage drive, such as, a floppy-disk drive, optical-disk drive, etc. The storage device may also be a means for loading computer programs or other instructions into the computer system. The computer system also includes a communication unit. The communication unit allows the computer to connect to other databases and the Internet through an Input/output (I/O) interface, allowing the transfer as well as reception of data from other databases. The communication unit may include a modem, an Ethernet card, or other similar devices, which enable the computer system to connect to databases and networks, such as, LAN, MAN, WAN, and the Internet. The computer system facilitates inputs from an employee through input device, accessible to the system through an I/O interface.

The computer system executes a set of instructions that are stored in one or more storage elements, in order to process input data. The storage elements may also hold data or other information, as desired. The storage element may be in the form of an information source or a physical memory element present in the processing machine.

The programmable or computer readable instructions may include various commands that instruct the processing machine to perform specific tasks such as, steps that constitute the method of the disclosure. The method and systems described can also be implemented using only software programming or using only hardware or by a varying combination of the two techniques. The disclosure is independent of the programming language and the operating system used in the computers. The instructions for the disclosure can be written in all programming languages including, but not limited to, 'C', 'C++', 'Visual C++' and 'Visual Basic'. Further, the software may be in the form of a collection of separate programs, a program module containing a larger program or a portion of a program module, as discussed in the ongoing description. The software may also include modular programming in the form of object-oriented programming. The processing of input data by the processing machine may be in response to employee commands, results of previous processing, or a request made by another processing machine. The disclosure can also be implemented in various operating systems and platforms including, but not limited to, 'Unix', DOS', 'Android', 'Symbian', and 'Linux'.

The programmable instructions can be stored and transmitted on a computer-readable medium. The disclosure can also be embodied in a computer program product comprising a computer-readable medium, or with any product capable of implementing the above methods and systems, or the numerous possible variations thereof.

The method, system, and computer program product, as described above, have numerous advantages. The present disclosure teaches a technique that along with the checking of the completeness of the hand filled document verifies and validates the correctness of the hand filled content in the handwritten document. Also, while digitization, the present technique requires less number of keystrokes and time by the data-entry user than it would have taken in complete manual data entry.

Various embodiments of the method and system for evaluating handwritten documents have been disclosed. However, it should be apparent to those skilled in the art that many more modifications, besides those described, are possible without departing from the inventive concepts herein. The embodiments, therefore, are not to be restricted, except in the spirit of the disclosure. Moreover, in interpreting the disclosure, all terms should be understood in the broadest possible manner consistent with the context. In particular, the terms "comprises" and "comprising" should be interpreted as referring to elements, components, or steps, in a non-exclusive manner, indicating that the referenced elements, components, or steps may be present, or utilized, or combined with other elements, components, or steps that are not expressly referenced.

A person having ordinary skills in the art will appreciate that the system, modules, and sub-modules have been illustrated and explained to serve as examples and should not be considered limiting in any manner. It will be further appreciated that the variants of the above disclosed system elements, or modules and other features and functions, or alternatives thereof, may be combined to create many other different systems or applications.

Those skilled in the art will appreciate that any of the aforementioned steps and/or system modules may be suitably replaced, reordered, or removed, and additional steps and/or system modules may be inserted, depending on the needs of a particular application. In addition, the systems of the aforementioned embodiments may be implemented using a wide variety of suitable processes and system modules and is not limited to any particular computer hardware, software, middleware, firmware, microcode, etc.

The claims can encompass embodiments for hardware, software, or a combination thereof.

It will be appreciated that variants of the above disclosed, and other features and functions or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method implementable on a computing device for evaluating a handwritten document, the method comprising:

identifying a handwritten character in each of one or more text fields in a digital image by applying a character recognition technique, wherein the digital image is obtainable by scanning the handwritten document, wherein each of the one or more text fields are associated with a section, and wherein the one or more text fields have an associated predefined character type determinable based on the associated section;

determining a character type of the identified handwritten character, wherein the character type of the identified handwritten character comprises at least one of a letter, a symbol, a number, or a special character;

comparing the character type of the handwritten character, identified from a text field of the one or more text fields, with the predefined character type associated with the text field;

validating the character type of the identified handwritten character in each of the one or more text fields based on the comparison; and recommending the identified handwritten character for each of the one or more text fields corresponding to the section, to a data-entry user, based on the validation.

2. The method of claim 1, wherein the character recognition technique is an Intelligent Character Recognition (ICR).

3. The method of claim 1 further comprising creating an evaluation report based on the validation.

4. The method of claim 1, wherein the recommendation is provided in a color different than the color of the handwritten character originally present in the handwritten document.

5. The method of claim 1, wherein the recommendation is acceptable or over-writable.

6. The method of claim 1, wherein the recommendation is provided at each keystroke during digitization of the handwritten document.

7. A system for evaluating a handwritten document, the system comprising:

an image-processing module configured for identifying a handwritten character in each of one or more text fields from a digital image by applying a character recognition technique, wherein the digital image is obtainable by scanning the handwritten document, wherein each of the one or more text fields are associated with a section, and wherein the one or more text fields have an associated predefined character type determinable based on the associated section;

a validation module configured for determining whether the handwritten document has been correctly filled, when a character type of the identified character matches with a predefined character type, wherein the matching is determined based on a comparison of the character type of the handwritten character identified from a text field with the predefined character type of the text field; and a recommendation module configured for recommending the identified handwritten character in each of the one or more text fields of a correctly filled handwritten document, to a data-entry user.

8. The system of claim 7, wherein the character comprises at least one of one or more alphabetic characters, one or more numeric characters, one or more marks, or one or more hand-drawn drawings.

9. The system of claim 7, wherein the image-processing module is further configured for facilitating the scanning of the handwritten document.

10. The system of claim 7 further comprising a database for storing the identified character from each of the one or more text fields and the associated predefined character types.

11. A non-transitory computer program product for use with a computer, the non-transitory computer program product comprising a computer readable program code for evaluating a handwritten document, the computer readable program code is executable by a processor in a computing device to:

identify a handwritten character in each of the one or more text fields in a digital image by applying a character recognition technique, wherein the digital image is obtainable by scanning of the handwritten document, wherein each of the one or more text fields are associated with a section, and wherein the one or more text fields have an associated predefined character type determinable based on the associated section;

determine a character type of the identified handwritten character, wherein a character type of the identified character comprises at least one of a letter, a symbol, a number, or a special character;

compare the character type of the handwritten character, identified from a text field of the one or more text fields, with the predefined character type associated with the text field;

validate the character type of the identified handwritten character in each of the one or more text fields based on the comparison; and     recommend the identified handwritten character for each of the one or more text fields, to a data entry user, based on the validation.

12. The non-transitory computer program product of claim 11, wherein the character recognition technique is an Intelligent Character Recognition (ICR).

13. The non-transitory computer program product of claim 11, wherein the computer readable program code is further executable by the processor to create an evaluation report based on the validating.

14. The non-transitory computer program product of claim 11, wherein the recommendation is provided in a color different from the color of the handwritten character originally present in the handwritten document.

15. The non-transitory computer program product of claim 11, wherein the recommendation is acceptable or over-writable.

16. The non-transitory computer program product of claim 11, wherein the recommendation is provided at each keystroke during digitalization of the handwritten document.

\* \* \* \* \*